(12) United States Patent
Konrad

(10) Patent No.: US 6,725,497 B2
(45) Date of Patent: Apr. 27, 2004

(54) DEVICE FOR PERFORMING JOBS ON A SURFACE WITH A BASE STATION

(75) Inventor: Jürgen Konrad, Ulm/Donau (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/230,752

(22) Filed: Aug. 29, 2002

(65) Prior Publication Data

US 2003/0033684 A1 Feb. 20, 2003

Related U.S. Application Data

(63) Continuation of application No. PCT/EP01/01328, filed on Feb. 7, 2001.

(30) Foreign Application Priority Data

Feb. 29, 2000 (DE) .......................... 100 09 514

(51) Int. Cl.⁷ .............................. A47L 11/38; A47L 1/02
(52) U.S. Cl. ........................ 15/302; 15/321; 134/198
(58) Field of Search .............................. 134/198, 172, 134/186; 15/302, 103, 321

(56) References Cited

U.S. PATENT DOCUMENTS

| | | | |
|---|---|---|---|
| 4,029,164 A | 6/1977 | Urakami | 180/164 |
| 4,112,535 A * | 9/1978 | Wild et al. | 15/302 |
| 4,688,289 A | 8/1987 | Urakami | 15/98 |
| 5,077,510 A | 12/1991 | Collie | 318/568.12 |
| 5,249,326 A * | 10/1993 | Jefferies et al. | 15/103 |
| 5,890,250 A | 4/1999 | Lange et al. | 15/50.3 |
| 5,901,720 A | 5/1999 | Lange | 134/172 |
| 6,090,221 A * | 7/2000 | Gan et al. | 15/103 |
| 6,269,517 B1 * | 8/2001 | Dornier | 15/302 |

FOREIGN PATENT DOCUMENTS

GB 2 268 457 A 1/1994

* cited by examiner

*Primary Examiner*—Theresa T. Snider
(74) *Attorney, Agent, or Firm*—Laurence A. Greenberg; Werner H. Stemer; Gregory L. Mayback

(57) ABSTRACT

With a work device that holds to a surface by vacuum pressure and can move on the surface to perform jobs and is connected to a base station through a supply line, there exists a danger that the work device will fall if the attractive force (vacuum pressure) weakens. To prevent such danger, the work device is connected to the base station through a safety line, with which it is possible to stop the fall of work device. As such, the work device can also be utilized in locations where it could fall from a great height in the event of failure, for instance, on the outside of buildings.

17 Claims, 1 Drawing Sheet

DEVICE FOR PERFORMING JOBS ON A SURFACE WITH A BASE STATION

CROSS-REFERENCE TO RELATED APPLICATION

This application is a continuation of copending International Application No. PCT/EP01/01328, filed Feb. 7, 2001, which designated the United States and was not published in English.

BACKGROUND OF THE INVENTION

Field of the Invention

The present invention relates to a device for performing jobs on a surface with at least one work device that includes a device for generating an underpressure between itself and the surface, and a drive for moving on the surface, and that is connected to a base station by a supply line.

British Patent No. GB 2 268 457 A teaches such a device in which several work devices, which are held to a sloping or vertical surface by vacuum pressure and can be moved along this surface, are connected to a compressed air source and a control through a supply line. Over the supply line, a data exchange between the work devices and the control takes place, on one hand, and, on the other hand, the work devices are supplied with energy in the form of compressed air for the purpose of generating the underpressure. This type of device is also disclosed in U.S. Pat. No. 5,077,510 to Collie.

A particular disadvantage of these devices is that, if the vacuum pressure generator fails and can no longer hold them on the surface, the work devices, being unprotected, can fall off and can cause serious damage given utilization at great heights.

SUMMARY OF THE INVENTION

It is accordingly an object of the invention to provide a device for performing jobs on a surface with a base station that overcomes the hereinafore-mentioned disadvantages of the heretofore-known devices of this general type and that improves safety and, in particular, prevents falls from great heights.

With the foregoing and other objects in view, there is provided, in accordance with the invention, a device for performing jobs on a surface, including at least one work device having a weight, vacuum generating device generating a holding force between the at least one work device and the surface, and a drive device for moving the at least one work device on the surface, a base station having a supply line connected to the at least one work device, and a safety line connecting the base station to the at least one work device, the safety line having a bearing capacity greater the weight of the at least one work device.

By virtue of the safety line between the base station and the at least one work device, the work device can only fall a limited distance in the event of a failure of the devices for holding onto the surface by suction. As such, the device can also be utilized on the outside of tall buildings without a risk of the work device falling and causing damage property or injuring persons at the foot of the building. If the work device on the outside of a building falls, it can only drop a limited distance corresponding to the length of the safety line, the invention being selected such that the work device cannot fall to the ground.

In accordance with another feature of the invention, to secure the work device, the base station has a larger mass and/or is provided with a device or means for anchoring itself at its environment. For instance, the base station can include non-slip feet or an extra clamp or line for anchoring at other objects. In particular, the base station has a mass approximately two to three times of a mass of the work device.

In accordance with a further feature of the invention, the base station has at least one energy device for storing and providing energy.

In accordance with an added feature of the invention, the base station advantageously contains a rechargeable battery with an appertaining charger and a current supply terminal. The overall device can, thus, be utilized with great flexibility, it being possible to achieve a particularly long operating period, given the ability to provide substantially larger batteries in the base station than would be possible in the work device, for which a low weight is desirable due to the energy-sapping vacuum adhesion mechanism.

Furthermore, the work device is supplied with at least one working medium through the supply line. For instance, if the at least one work device is utilized for cleaning the surface, a cleaning agent or cleaning liquid can be supplied over the supply line. Likewise, used working media such as used cleaning liquid can be drained off through the supply line.

In such a case, the base station includes devices for providing working media and devices for catching used working media. In preparation for use, the rechargeable battery is charged in the base station in that the base station is simply connected to the current supply network, and in that working media such as cleaning or rinsing liquids that are required for the work are refilled. To accomplish this, the work device need not be connected to the base station. The base station and the work device can then be moved to the working location and are ready for use after the safety line and supply line are connected as warranted.

The supplying of the work device with energy and/or with at least one working medium from a base station through a supply line is also possible regardless of a safety line.

In accordance with an additional feature of the invention, to prevent tangling of the supply line or safety line, devices for winding and unwinding the safety line and the supply line can be provided in the base station and/or the work device. These devices can be biased so that the lines are unwound as soon as the at least one work device is moved away from the base station and automatically rewound again when it is moved toward the base station again. The winding/rewinding also reduces the risk that objects will be pulled down by the safety line and/or the supply line or that the safety line and/or supply line will get hung up on objects when the work device is moved.

In accordance with a concomitant feature of the invention, the unwinding of the safety line can be braked or locked according to speed so that, in the event of a failure where the work device detaches, the fall is stopped with optimal speed, as with a safety harness.

Other features that are considered as characteristic for the invention are set forth in the appended claims.

Although the invention is illustrated and described herein as embodied in a device for performing jobs on a surface with a base station, it is, nevertheless, not intended to be limited to the details shown because various modifications and structural changes may be made therein without departing from the spirit of the invention and within the scope and range of equivalents of the claims.

The construction and method of operation of the invention, however, together with additional objects and

DESCRIPTION OF THE PREFERRED EMBODIMENTS

Figure 1:
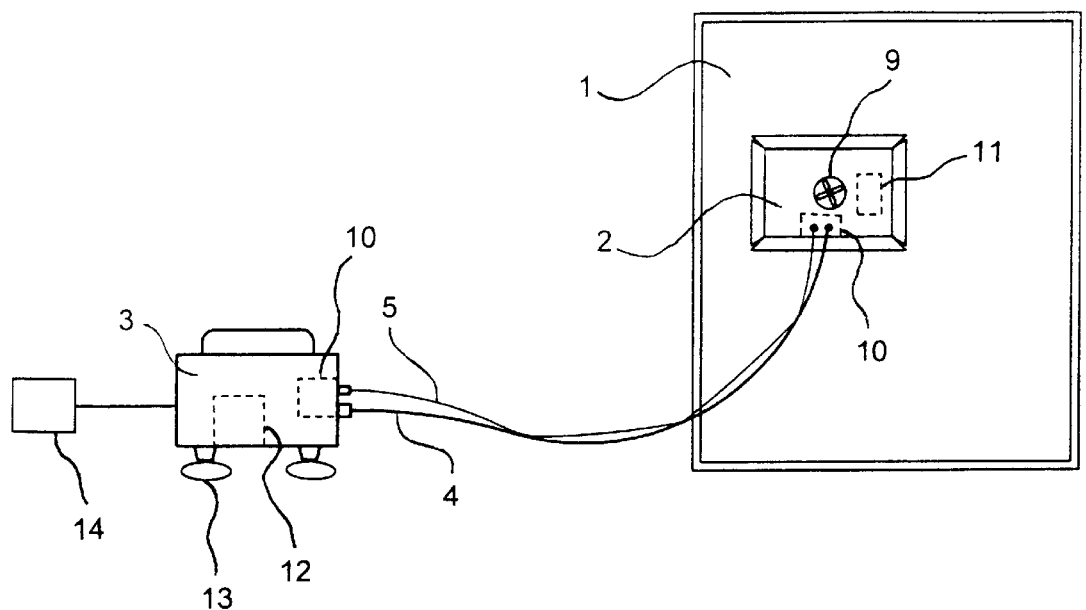
FIG. 1 is a diagrammatic illustration of a work device connected to a base station according to the invention for cleaning on a surface.

Referring now to the figures of the drawings in detail and first, particularly to FIG. 1 thereof, there is shown a device for performing cleaning jobs on a surface 1 that has a base station 3 and at least one work device 2. The work device 2 is equipped with a vacuum blower 9 providing suction onto the surface 1 and an undercarriage, running gear, and/or bogie assembly providing movement on the surface 1. The work device 2 also includes a drive device 11 for moving the at least one work device 2 on the surface 1. The work device 2 further includes a device for cleaning the surface 1, particularly, a window.

The base station 3 and the work device 2 are connected through a supply line 4 and a safety line 5, whereby their connection to the base station 3, in particular, is detachable. The base station has a larger mass and/or is provided with a device for anchoring 13 itself at its environment. It can be provided that the supply line 4 and the safety line 5 can be connected to the base station 3, or fastened on it, with the aid of a connecting element. Devices 10 for winding and unwinding the safety line and the supply line can be provided in the base station and/or the work device.

The base station 3 has inside thereof a rechargeable battery, an appertaining charger, and a current supply unit for connecting to a mains or household current. It is, thus, possible to charge the batteries for driving the work device 2 simply by connecting the base station 3 to the current network.

In a development of the invention, the base station 3 can have additional devices 12 and 14 for supplying the work device 2 with a cleaning liquid. To such an end, a corresponding hose is provided in the supply line 4, whereby the supply line 4 and the base station 3 can also be constructed such that the used cleaning liquid can also be carried from the work device 2 back to the base station 3.

Figure 2:
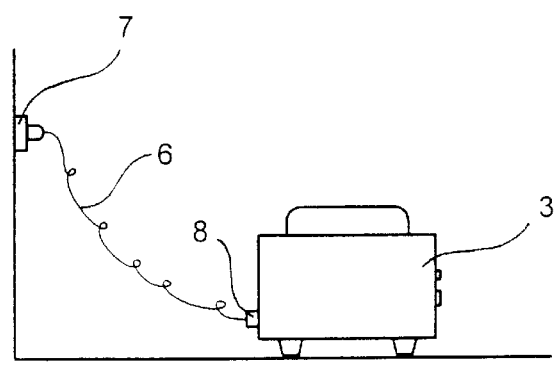
FIG. 2 is a diagrammatic illustration of the base station of FIG. 1 during charging of a battery.

FIG. 2 represents the base station 3 during the charging of the batteries. To accomplish recharging, the base station 3 is connected to a socket 7 with its current supply terminal 8 through a current cable 6. The supply line 4 and the safety line 5 can be removed from the base station, which improves handling. New cleaning liquid may have to be refilled in the base station 3 and used cleaning liquid eliminated as warranted. The base station 3 and work device 2 are then ready for use.

I claim:

1. A device for performing jobs on a surface, comprising:
    at least one work device having:
        a weight;
        vacuum generating device generating a holding force between said at least one work device and the surface; and
        a drive device for moving said at least one work device on the surface;
    a base station having a supply line connected to said at least one work device; and
    a safety line directly connecting said base station to said at least one work device, said safety line having a bearing capacity greater than said weight of said at least one work device.

2. The device according to claim 1, wherein said base station is heavier than said at least one work device.

3. The device according to claim 2, wherein:
    said at least one work device has a given mass; and
    said base station has a mass between approximately two and three times said given mass.

4. The device according to claim 1, wherein said base station has an anchor for anchoring said base station.

5. The device according to claim 1, wherein said base station has means for anchoring said base station.

6. The device according to claim 1, wherein said base station has at least one rechargeable battery.

7. The device according to claim 6, wherein said at least one rechargeable battery stores and provides energy.

8. The device according to claim 7, wherein said base station has:
    a current supply terminal; and
    a charger.

9. The device according to claim 1, wherein said base station has at least one device for supplying said at least one work device with at least one working medium through said supply line.

10. The device according to claim 9, wherein said at least one working medium is a cleaning fluid.

11. The device according to claim 1, including at least one supply device connected to said base station, said at least one supply device supplying said at least one work device with at least one working medium through said supply line.

12. The device according to claim 1, wherein said base station has at least one device for at least one of winding and unwinding at least one of said safety line and said supply line.

13. The device according to claim 12, wherein said at least one winding/unwinding device one of brakes and locks an unwinding of said safety line dependent upon a movement speed of said safety line.

14. The device according to claim 1, including at least one winding/unwinding device connected to said base station, said at least one winding/unwinding device winding and unwinding at least one of said safety line and said supply line.

15. The device according to claim 1, wherein:
    said base station is heavier than said at least one work device; and
    said base station has:
        an anchor for anchoring said base station;
        a rechargeable battery storing and providing energy for at least one of said base station and said at least one work device;
        a charger for providing energy to said rechargeable battery;

a current supply terminal connected to said charger for connecting said charger to a supply mains;

at least one medium supply device connected to said supply line, said at least one supply device supplying said at least one work device with at least one working medium through said supply line; and at least one winding/unwinding device connected to at least one of said safety line, said supply line, and said at least one work device, said at least one winding/unwinding device winding and unwinding at least one of said safety line and said supply line.

16. The device according to claim 15, wherein said at least one winding/unwinding device one of brakes and locks an unwinding of said safety line dependent upon a movement speed of said safety line.

17. A device for performing jobs on a surface, comprising:

at least one work device having:
 a weight;
 means for generating a vacuum between said at least one work device and the surface; and
 drive means for moving said at least one work device on the surface;

a base station having a supply line connected to said at least one work device; and a safety line directly connecting said base station to said at least one work device, said safety line having a bearing capacity greater than said weight of said at least one work device.

* * * * *